(12) United States Patent  
Hirade (10) Patent No.: US 11,073,535 B2  
(45) Date of Patent: Jul. 27, 2021

(54) SCANNING PROBE MICROSCOPE WITH CASE AND ELASTIC BODY

(71) Applicant: Shimadzu Corporation, Kyoto (JP)

(72) Inventor: Masato Hirade, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 0 days.

(21) Appl. No.: 16/728,351

(22) Filed: Dec. 27, 2019

(65) Prior Publication Data

US 2020/0341027 A1 Oct. 29, 2020

(30) Foreign Application Priority Data

Apr. 25, 2019 (JP) .............................. JP2019-083856

(51) Int. Cl.
- *G01Q 20/04* (2010.01)
- *G01Q 10/06* (2010.01)
- *G01Q 60/02* (2010.01)

(52) U.S. Cl.
CPC ........... *G01Q 20/04* (2013.01); *G01Q 10/065* (2013.01); *G01Q 60/02* (2013.01)

(58) Field of Classification Search
CPC ...... G01Q 20/04; G01Q 10/065; G01Q 60/02; G01Q 20/02; G01Q 60/32; G01Q 10/045; G01Q 60/30; G01Q 60/38; G01Q 60/24; G01Q 10/06; G01Q 70/06; G01Q 20/00; G01Q 10/00; G01Q 70/10; G01Q 60/34; G01Q 10/04; G01Q 30/06; G01Q 70/14; G01Q 30/14; G01Q 60/22; G01Q 30/04; G01Q 40/00; G01Q 10/02; G01Q 30/02; G01Q 60/44; G01Q 70/08; G01Q 60/04; G01Q 60/06; G01Q 70/02; G01Q 30/025; G01Q 60/10; G01Q 60/26; G01Q 60/366;

(Continued)

(56) References Cited

U.S. PATENT DOCUMENTS 5,376,790 A * 12/1994 Linker ................... G01Q 10/04  
    250/307  
5,426,302 A * 6/1995 Marchman ............. B82Y 20/00  
    850/6

(Continued)

FOREIGN PATENT DOCUMENTS

| JP | H05-20026 U | 3/1993 |
| JP | H10-068736 A | 3/1998 |

(Continued)

OTHER PUBLICATIONS

Notice of Reasons for Refusal (First Office Action) for JP2019-083856, submitted with a machine translation.

(Continued)

*Primary Examiner* — Brooke Purinton  
(74) *Attorney, Agent, or Firm* — Muir Patent Law, PLLC (57) ABSTRACT

A scanning probe microscope includes a case, an actuator, at least one elastic body, and a probe. The actuator includes a piezoelectric scanner having a cylindrical shape and a sample holder. The piezoelectric scanner is disposed inside the case to be coaxial with the case such that the first end is fixed to the bottom portion. The sample holder is provided at a second end of the piezoelectric scanner. At least one elastic body is disposed so as to be sandwiched between the case and at least one of the piezoelectric scanner and the sample holder.

8 Claims, 7 Drawing Sheets

(58) Field of Classification Search
CPC ........ G01Q 80/00; G01Q 30/18; G01Q 40/02;
G01Q 60/16; G01Q 60/28; G01Q 60/36;
G01Q 60/40; G01Q 60/42; G01Q 30/00;
G01Q 30/08; G01Q 30/10; G01Q 30/20;
G01Q 60/18; G01Q 60/363; G01Q 60/46;
G01Q 60/58; G01Q 60/60; G01Q 70/12;
G01Q 90/00
See application file for complete search history.

(56) References Cited

U.S. PATENT DOCUMENTS

| | | | | |
|---|---|---|---|---|
| 7,732,985 | B2 * | 6/2010 | Choi | H02N 2/028 |
| | | | | 310/328 |
| 7,870,616 | B2 * | 1/2011 | Meister | G01Q 30/14 |
| | | | | 850/21 |
| 8,058,780 | B2 | 11/2011 | Iyoki | |
| 9,689,892 | B2 | 6/2017 | Hirade | |
| 9,746,494 | B2 * | 8/2017 | Nishida | G01Q 30/14 |
| 2010/0320171 | A1 * | 12/2010 | Mao | B82Y 10/00 |
| | | | | 216/65 |
| 2011/0304241 | A1 * | 12/2011 | Voigtlaender | G01Q 10/04 |
| | | | | 310/323.02 |
| 2016/0291053 | A1 * | 10/2016 | Shigeno | G01Q 30/06 |
| 2017/0131324 | A1 | 5/2017 | Hirade | |

FOREIGN PATENT DOCUMENTS

| | | |
|---|---|---|
| JP | 2003-114181 A | 4/2003 |
| JP | 2003-194694 A | 7/2003 |
| JP | 2009-180632 A | 8/2009 |
| JP | 2009-192252 A | 8/2009 |
| JP | 2016-033468 A | 3/2016 |
| JP | 6135820 B2 | 5/2017 |
| WO | 2015/140996 A1 | 9/2015 |

OTHER PUBLICATIONS

Decision of Refusal for JP2019-083856, submitted with a machine translation.

* cited by examiner

SCANNING PROBE MICROSCOPE WITH CASE AND ELASTIC BODY

BACKGROUND OF THE INVENTION

Field of the Invention

The present invention relates to a scanning probe microscope.

Description of the Background Art

As a prior art document, WO2015/140996 discloses a configuration of a scanning probe microscope. The scanning probe microscope disclosed in WO2015/140996 includes a piezoelectric scanner having a cylindrical shape, a sample table provided on the piezoelectric scanner and holding a sample, and a probe disposed above the sample.

The scanning probe microscope is required to raise the scanning speed while suppressing narrowing of the scanning range.

SUMMARY OF THE INVENTION

A main object of the present invention is to provide a scanning probe microscope capable of raising the scanning speed while suppressing narrowing of the scanning range.

A scanning probe microscope according to the first embodiment of the present invention includes: a case having a cylindrical shape with a bottom; an actuator; at least one elastic body; and a probe. The case has a bottom portion and a circumferential wall portion. The actuator is disposed inside the case. The at least one elastic body is disposed between the case and the actuator. The probe is moved relative to the actuator for scanning. The actuator includes a piezoelectric scanner having a cylindrical shape and a sample holder. The piezoelectric scanner includes: a first end in an axis direction; a second end on a side opposite to the first end in the axis direction; a first electrode portion to which a voltage is applied such that the piezoelectric scanner is displaced in the axis direction; and a second electrode portion to which a voltage is applied such that the piezoelectric scanner is displaced in a direction orthogonal to the axis direction. The piezoelectric scanner is disposed inside the case to be coaxial with the case such that the first end is fixed to the bottom portion. The sample holder is provided at the second end of the piezoelectric scanner. The at least one elastic body is disposed so as to be sandwiched between the case and at least one of the piezoelectric scanner and the sample holder.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

In the following, a scanning probe microscope according to each embodiment of the present invention will be described with reference to the accompanying drawings. In the description of the following embodiments, the same or corresponding components in each figure will be designated by the same reference characters, and description thereof will not be repeated.

A scanning probe microscope serves as a microscope configured to scan the surface of a sample with a probe to detect a certain interaction with the sample, thereby allowing acquisition of an observation image of the surface of the sample with high magnification. Examples of the scanning probe microscope may include: a scanning tunneling microscope (STM) that detects the current flowing between the probe and the sample as an interaction; an atomic force microscope (AFM) that detects the atomic force acting between the probe and the sample as an interaction; and the like. In the following description of the embodiments, an atomic force microscope will be described as a scanning probe microscope, but the scanning probe microscope is not limited to an atomic force microscope and may be other scanning probe microscopes such as a scanning tunneling microscope.

First Embodiment

Figure 1:
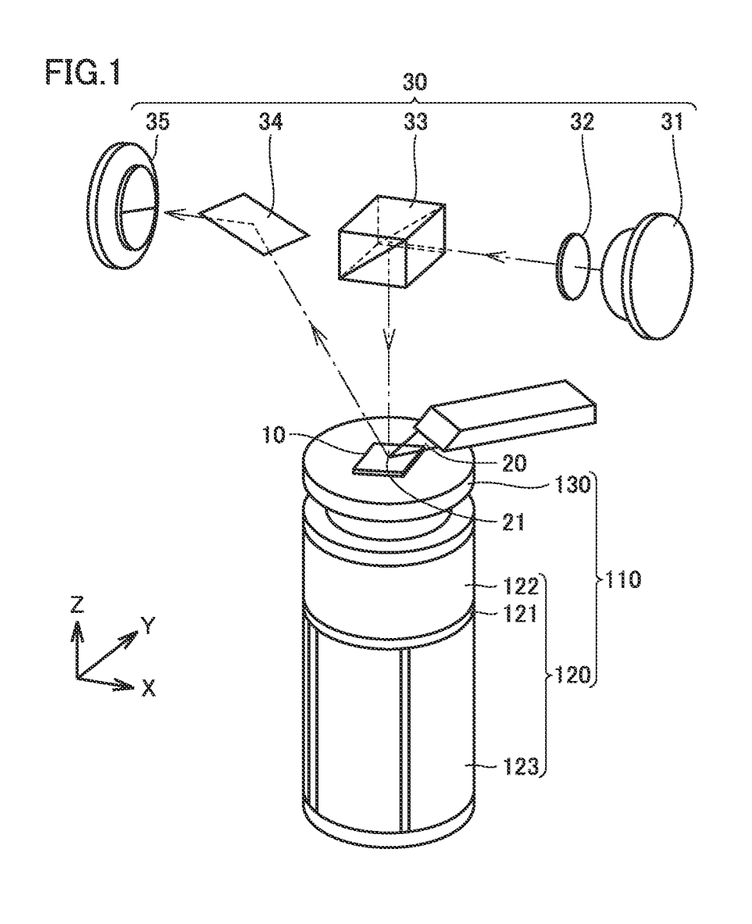
FIG. 1 is a diagram showing the fundamental configuration of a detection unit of a scanning probe microscope according to the first embodiment of the present invention.

FIG. 1 is a diagram showing the fundamental configuration of a detection unit of a scanning probe microscope according to the first embodiment of the present invention. As shown in FIG. 1, in the scanning probe microscope according to the first embodiment of the present invention, a sample 10 as a target to be observed is held on a sample holder 130 provided on piezoelectric scanner 120 having an approximately cylindrical shape. Piezoelectric scanner 120 and sample holder 130 are included in an actuator 110. The center of gravity of sample holder 130 is located on a center axis C (shown in FIG. 2 described later) of piezoelectric scanner 120.

Piezoelectric scanner 120 includes: a first electrode portion 122 to which a voltage is applied such that piezoelectric scanner 120 is displaced in an axis direction of piezoelectric scanner 120; and a second electrode portion 123 to which a voltage is applied such that piezoelectric scanner 120 is displaced in the direction orthogonal to the axis direction.

Specifically, piezoelectric scanner 120 includes a piezoelectric element 121 having an outer circumference, on which first electrode portion 122 and second electrode portion 123 are disposed. Second electrode portion 123 includes: one electrode portion to which a voltage is applied such that piezoelectric scanner 120 is displaced in an X-axis direction; and the other electrode portion to which a voltage is applied such that piezoelectric scanner 120 is displaced in a Y-axis direction.

By applying a voltage to first electrode portion 122, piezoelectric element 121 is deformed and piezoelectric scanner 120 is displaced in a Z-axis direction. As a result, sample 10 held on sample holder 130 is displaced in the Z-axis direction.

By applying a voltage to second electrode portion 123, piezoelectric element 121 is deformed and piezoelectric scanner 120 is displaced in two axis directions including the X-axis direction and the Y-axis direction. As a result, sample 10 held on sample holder 130 is displaced in two axis directions including the X-axis direction and the Y-axis direction.

A cantilever 20 having a tip end provided with a probe 21 is disposed above sample 10. When the sharp tip end of probe 21 attached to cantilever 20 is disposed so as to provide a gap of several nm or less between this tip end and sample 10, atomic force is exerted between the tip end of probe 21 and the atoms in sample 10.

In this state, probe 21 is moved relative to actuator 110 for scanning. Specifically, so as to move probe 21 relative to sample 10 within the X-Y plane for scanning the surface of sample 10, piezoelectric scanner 120 is displaced in two axis directions including the X-axis direction and the Y-axis direction, and also, piezoelectric scanner 120 is displaced in the Z-axis direction while performing feedback control of the distance between probe 21 and sample 10 in the Z-axis direction so as to keep the above-mentioned atomic force constant. The amount of displacement of piezoelectric scanner 120 in the Z-axis direction at this time proportionally corresponds to the protrusions and recesses on the surface of sample 10. Accordingly, a three-dimensional image of the surface of sample 10 can be obtained based on: the amount of displacement of piezoelectric scanner 120 in two axis directions including the X-axis direction and the Y-axis direction; and the amount of displacement of piezoelectric scanner 120 in the Z-axis direction.

As shown in FIG. 1, a light measurement unit 30 is provided above cantilever 20 in order to detect the displacement of cantilever 20 in the Z-axis direction. Light measurement unit 30 includes a laser diode 31, a lens 32, a beam splitter 33, a mirror 34, and a light detector 35.

In light measurement unit 30, the laser beam emitted from laser diode 31 and condensed into lens 32 is reflected by beam splitter 33 so as to be applied to the portion at and around the tip end of cantilever 20. The reflected light of the laser beam is detected by light detector 35 through mirror 34. Light detector 35 includes a plurality of light receiving surfaces divided in the Z-axis direction corresponding to the direction of displacement of cantilever 20. Thus, when cantilever 20 is displaced up and down, the proportion of the quantity of light entering the plurality of light receiving surfaces is changed. Accordingly, the amount of displacement of cantilever 20 can be calculated by computing the detection signal obtained according to the quantity of light in each of the plurality of light receiving surfaces.

In the following, the configuration of the actuator unit included in the scanning probe microscope according to the first embodiment of the present invention will be described.

Figure 2:
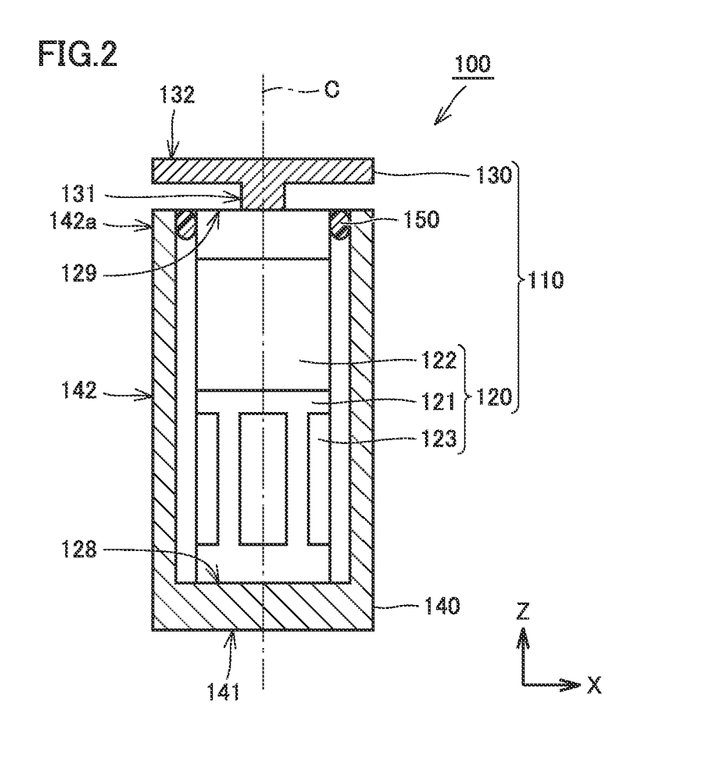
FIG. 2 is a partial cross-sectional view showing the configuration of an actuator unit included in the scanning probe microscope according to the first embodiment of the present invention.

FIG. 2 is a partial cross-sectional view showing the configuration of an actuator unit included in the scanning probe microscope according to the first embodiment of the present invention. FIG. 2 shows each of sample holder 130, case 140 and elastic body 150 in a cross-sectional view, and also shows piezoelectric scanner 120 in a side view.

As shown in FIG. 2, an actuator unit 100 included in the scanning probe microscope according to the first embodiment of the present invention includes a case 140 having a cylindrical shape with a bottom, an actuator 110, and at least one elastic body 150.

Case 140 has a bottom portion 141 having a disk shape and a circumferential wall portion 142 having a cylindrical shape. Actuator 110 is disposed inside case 140. Actuator 110 includes a piezoelectric scanner 120 having a cylindrical shape and a sample holder 130.

Piezoelectric scanner 120 has a first end 128 in the Z-axis direction corresponding to the axis direction, and a second end 129 on the side opposite to first end 128. Piezoelectric scanner 120 is disposed inside case 140 to be coaxial with case 140 such that first end 128 is fixed to bottom portion 141 of case 140.

As described above, piezoelectric scanner 120 includes a piezoelectric element 121 having a cylindrical shape, and a first electrode portion 122 and a second electrode portion 123 that are disposed on the outer circumference of piezoelectric element 121. In the present embodiment, first electrode portion 122 is located closer to second end 129 in the Z-axis direction than second electrode portion 123 is. Second end 129 of piezoelectric scanner 120 is closed.

Sample holder 130 is provided at second end 129 of piezoelectric scanner 120. In the present embodiment, sample holder 130 is formed of a connection portion 131 and a flat plate portion 132. Sample holder 130 is made of metal.

Connection portion 131 extends cylindrically in the axis direction of piezoelectric scanner 120 and is connected to second end 129 of piezoelectric scanner 120. Flat plate portion 132 is located on the opposite side of second end 129 with respect to connection portion 131, and has a disk shape that is coaxial with connection portion 131. Flat plate portion 132 holds a sample.

At least one elastic body 150 is disposed between case 140 and actuator 110. In the present embodiment, one O ring is disposed as at least one elastic body 150 so as to be sandwiched between piezoelectric scanner 120 and case 140. Specifically, elastic body 150 is in contact with the inner circumferential surface of an end portion 142a of circumferential wall portion 142 of case 140. End portion 142a is located on the side opposite to bottom portion 141 in the Z-axis direction. It is to be noted that the number of O rings is not limited to one but may be two or more.

In the present embodiment, the O ring as elastic body 150 is made of an elastomer. The material of elastic body 150 is not limited to an elastomer but may be a spring or a gel.

The following is an explanation about the operation of actuator 110 included in the scanning probe microscope according to the first embodiment of the present invention.

When piezoelectric scanner 120 is displaced in the Z-axis direction, first electrode portion 122 is applied with a voltage that is obtained by performing feedback of the amount of displacement of probe 21 in the Z-axis direction that is caused by flexure of cantilever 20. When piezoelectric scanner 120 is displaced in two axis directions including the X-axis direction and the Y-axis direction, second electrode portion 123 is applied with a voltage so as to conduct scanning according to the sequence that is set by the user of the scanning probe microscope.

In actuator unit 100 of the scanning probe microscope according to the present embodiment, elastic body 150 formed of an elastomer having high repulsive elasticity is disposed so as to be sandwiched between piezoelectric scanner 120 and end portion 142a of circumferential wall portion 142 of case 140.

First end 128 of piezoelectric scanner 120 is fixed to bottom portion 141 of case 140 while second end 129 of piezoelectric scanner 120 is connected to circumferential wall portion 142 of case 140 with elastic body 150 interposed therebetween.

Elastic body 150 is formed of an elastomer having high repulsive elasticity. Thus, as the oscillation frequency of piezoelectric scanner 120 becomes higher, the elastomer behaves as substantially becoming harder.

In actuator unit 100 according to the present embodiment, second end 129 of piezoelectric scanner 120 is connected to circumferential wall portion 142 of case 140 with elastic body 150 interposed therebetween. Thereby, the axial rigidity of actuator 110 is increased. Specifically, when piezoelectric scanner 120 is displaced in one of the axis directions, elastic body 150 receives a tensile load acting in the forward direction with respect to the direction of displacement of piezoelectric scanner 120. In contrast, piezoelectric scanner 120 receives a compressive load acting in the backward direction with respect to the direction of displacement of piezoelectric scanner 120. As a result, the axial rigidity of actuator 110 is increased.

As the axial rigidity of actuator 110 is increased, the elastic resonance frequency of actuator 110 becomes higher than that in the case where elastic body 150 is not provided in actuator unit 100. As the elastic resonance frequency of actuator 110 becomes higher, the scanning speed (response speed) in the Z-axis direction can be raised. In addition, elastic body 150 is elastically deformed according to the displacement of piezoelectric scanner 120. Thus, narrowing of the scanning range of piezoelectric scanner 120 in the Z-axis direction is suppressed.

Also, in actuator unit 100 according to the present embodiment, second end 129 of piezoelectric scanner 120 is connected to circumferential wall portion 142 of case 140 with elastic body 150 interposed therebetween. Thereby, the flexural rigidity of actuator 110 is increased. Specifically, when piezoelectric scanner 120 is displaced in one of the radial directions, elastic body 150 located on the forward side in the direction of displacement of piezoelectric scanner 120 receives a compressive load while elastic body 150 located on the backward side in the direction of displacement of piezoelectric scanner 120 receives a tensile load. In contrast, piezoelectric scanner 120 receives a compressive load in the backward direction with respect to the direction of displacement of piezoelectric scanner 120 from elastic body 150 located on the forward side in the direction of displacement of piezoelectric scanner 120, and also receives a tensile load in the backward direction with respect to the direction of displacement of piezoelectric scanner 120 from elastic body 150 located on the backward side in the direction of displacement of piezoelectric scanner 120. As a result, the flexural rigidity of actuator 110 is increased.

As the flexural rigidity of actuator 110 is increased, the flexural resonance frequency of actuator 110 becomes higher than that in the case where elastic body 150 is not provided in actuator unit 100. As the flexural resonance frequency of actuator 110 becomes higher, the scanning speed in two axis directions including the X-axis direction and the Y-axis direction can be raised. In addition, elastic body 150 is deformed elastically according to the displacement of piezoelectric scanner 120. Thus, narrowing of the scanning range of piezoelectric scanner 120 in two axis directions including the X-axis direction and the Y-axis direction is suppressed.

In actuator unit 100 according to the present embodiment, second end 129 of piezoelectric scanner 120 is connected to circumferential wall portion 142 of case 140 with elastic body 150 interposed therebetween, which allows sealing between piezoelectric scanner 120 and case 140. As a result, intrusion of water and the like between piezoelectric scanner 120 and case 140 can be suppressed.

In the scanning probe microscope according to the first embodiment of the present invention, at least one elastic body 150 is disposed so as to be sandwiched between piezoelectric scanner 120 and case 140. Thereby, the resonance frequency of actuator 110 can be raised to thereby raise the scanning speed while suppressing narrowing of the scanning range of piezoelectric scanner 120.

In the scanning probe microscope according to the first embodiment of the present invention, elastic body 150 is an O ring, so that intrusion of water and the like between piezoelectric scanner 120 and case 140 can be suppressed.

In the scanning probe microscope according to the first embodiment of the present invention, first electrode portion 122 is located closer to second end 129 in the Z-axis direction than second electrode portion 123 is, and at least one elastic body 150 is in contact with end portion 142a of circumferential wall portion 142, which is located on the side opposite to bottom portion 141 in the Z-axis direction. Thereby, the flexural rigidity of piezoelectric scanner 120 can be effectively increased. As a result, while raising the scanning speed (response speed) of piezoelectric scanner 120 in the Z-axis direction, the scanning speed of piezoelectric scanner 120 in two axis directions including the X-axis direction and the Y-axis direction can also be effectively raised.

Second Embodiment

Figure 3:
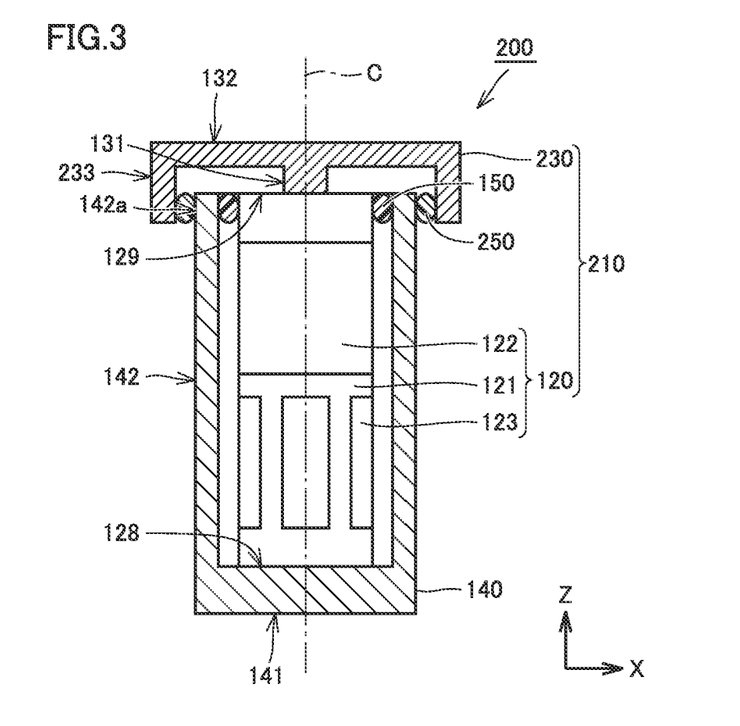
FIG. 3 is a partial cross-sectional view showing the configuration of an actuator unit included in a scanning probe microscope according to the second embodiment of the present invention.
Figure 4:
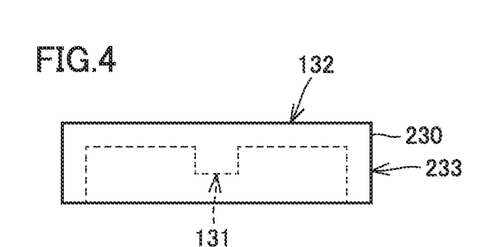
FIG. 4 is a side view showing the external appearance of a sample holder included in the scanning probe microscope according to the second embodiment of the present invention.

The scanning probe microscope according to the second embodiment of the present invention is different from the scanning probe microscope according to the first embodiment of the present invention only in the shape of sample holder 230 and in that it includes elastic body 250. Accordingly, the same configuration as that of the scanning probe microscope according to the first embodiment of the present invention will not be repeated.

FIG. 3 is a partial cross-sectional view showing the configuration of an actuator unit included in a scanning probe microscope according to the second embodiment of the present invention. FIG. 4 is a side view showing the external appearance of a sample holder included in the scanning probe microscope according to the second embodiment of the present invention. FIG. 3 shows each of a sample holder 230, a case 140, an elastic body 150, and an elastic body 250 in a cross-sectional view and also shows a piezoelectric scanner 120 in a side view.

As shown in FIGS. 3 and 4, an actuator unit 200 included in the scanning probe microscope according to the second embodiment of the present invention includes a case 140 having a cylindrical shape with a bottom, an actuator 210, an elastic body 150, and an elastic body 250.

Actuator 210 is disposed inside case 140. Actuator 210 includes a piezoelectric scanner 120 having a cylindrical shape and a sample holder 230.

Sample holder 230 includes: a connection portion 131; a flat plate portion 132 that holds a sample; and a protruding portion 233 that protrudes from the edge of flat plate portion 132 so as to surround an end portion 142a of a circumferential wall portion 142 of case 140 from outside. End portion 142a is located on the side opposite to a bottom portion 141 in the Z-axis direction. Protruding portion 233 has a cylindrical shape.

Elastic body 250 is an O ring. Elastic body 250 is made of an elastomer as with elastic body 150. Thus, in the second embodiment of the present invention, two O rings are provided as elastic bodies.

Elastic body 250 is disposed between case 140 and actuator 210. Elastic body 250 is in contact with the outer circumferential surface of end portion 142a of circumferential wall portion 142 of case 140. End portion 142a is located on the side opposite to bottom portion 141 in the Z-axis direction.

In actuator unit 200 of the scanning probe microscope according to the present embodiment, elastic body 250 made of an elastomer having high repulsive elasticity is disposed so as to be sandwiched between protruding portion 233 of sample holder 230 and end portion 142a of circumferential wall portion 142 of case 140.

As with elastic body 150, elastic body 250 can also increase the axial rigidity of actuator 210 and the flexural rigidity of actuator 210. As a result, the elastic resonance frequency and the flexural resonance frequency of actuator 210 can be raised. Accordingly, the scanning speed (response speed) of actuator 210 in the Z-axis direction and the scanning speed of actuator 210 in two axis directions including the X-axis direction and the Y-axis direction can be raised. Elastic body 250 is deformed elastically according to the displacement of piezoelectric scanner 120, thereby suppressing narrowing of: the scanning range of piezoelectric scanner 120 in the Z-axis direction; and the scanning range of piezoelectric scanner 120 in two axis directions including the X-axis direction and the Y-axis direction.

In actuator unit 200 according to the present embodiment, second end 129 of piezoelectric scanner 120 is connected to protruding portion 233 of sample holder 230 with elastic body 250 interposed therebetween, thereby allowing sealing between sample holder 230 and case 140. As a result, intrusion of water and the like between sample holder 230 and case 140 can be suppressed.

Third Embodiment

Figure 5:
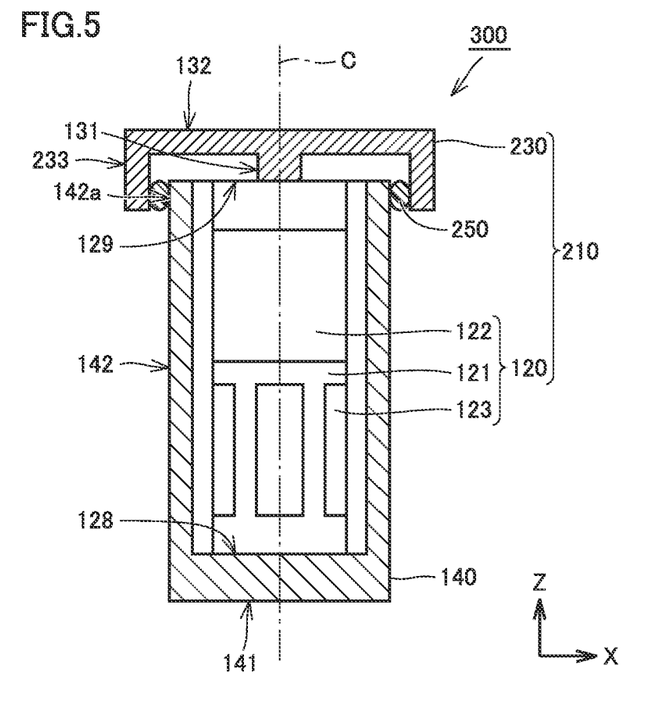
FIG. 5 is a partial cross-sectional view showing the configuration of an actuator unit included in a scanning probe microscope according to the third embodiment of the present invention.

The scanning probe microscope according to the third embodiment of the present invention is different from the scanning probe microscope according to the second embodiment of the present invention only in that it does not include elastic body 150. Accordingly, the same configuration as that of the scanning probe microscope according to the second embodiment of the present invention will not be repeated.

FIG. 5 is a partial cross-sectional view showing the configuration of an actuator unit included in a scanning probe microscope according to the third embodiment of the present invention. FIG. 5 shows each of sample holder 230, case 140, and elastic body 250 in a cross-sectional view and also shows piezoelectric scanner 120 in a side view.

As shown in FIG. 5, an actuator unit 300 included in the scanning probe microscope according to the third embodiment of the present invention includes a case 140 having a cylindrical shape with a bottom, an actuator 210, and an elastic body 250.

The scanning probe microscope according to the third embodiment of the present invention also allows the scanning speed to be raised while suppressing narrowing of the scanning range of piezoelectric scanner 120.

Fourth Embodiment

Figure 6:
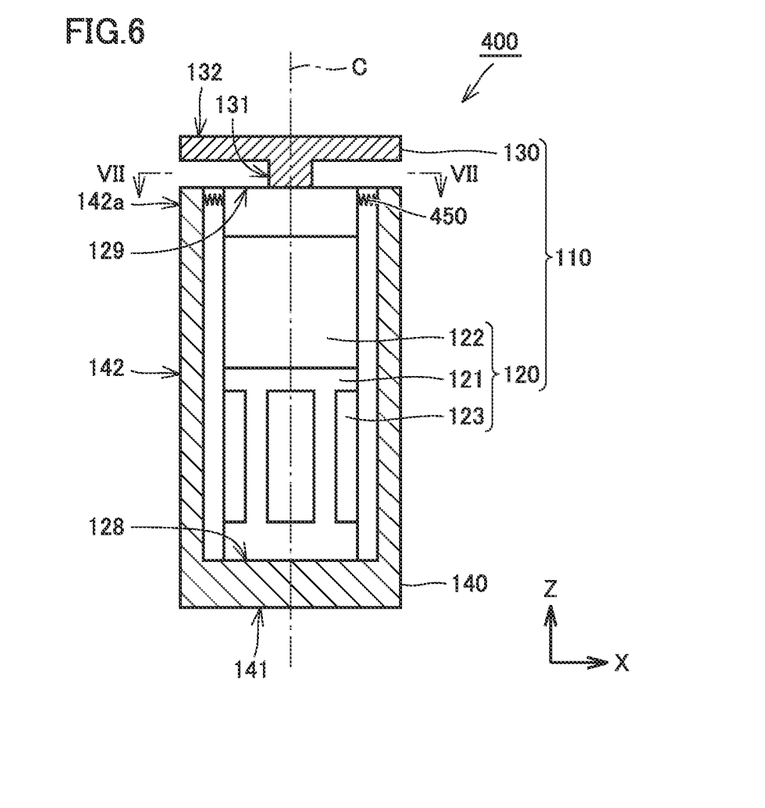
FIG. 6 is a partial cross-sectional view showing the configuration of an actuator unit included in a scanning probe microscope according to the fourth embodiment of the present invention.
Figure 7:
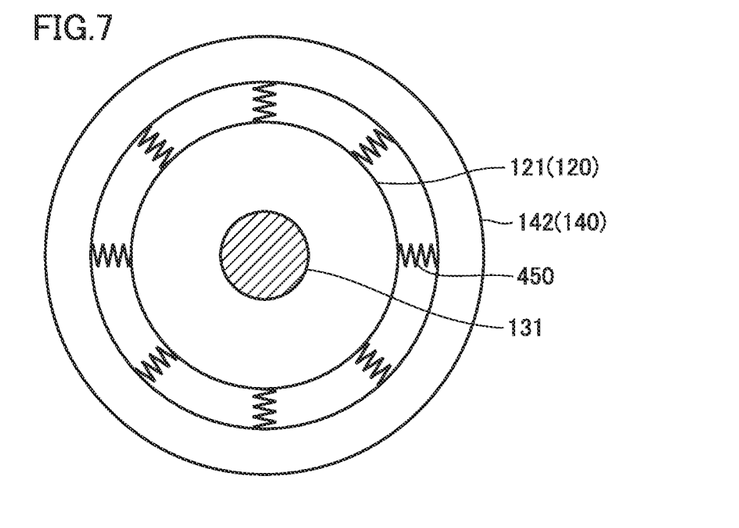
FIG. 7 is a diagram showing the actuator unit in FIG. 6 as seen from the direction indicated by an arrow line VII-VII.

The scanning probe microscope according to the fourth embodiment of the present invention is different from the scanning probe microscope according to the first embodiment of the present invention only in the configuration of the elastic body. Accordingly, the same configuration as that of the scanning probe microscope according to the first embodiment of the present invention will not be repeated.

FIG. 6 is a partial cross-sectional view showing the configuration of an actuator unit included in a scanning probe microscope according to the fourth embodiment of the present invention. FIG. 7 is a diagram showing the actuator unit in FIG. 6 as seen from the direction indicated by an arrow line FIG. 6 shows each of sample holder 130 and case 140 in a cross-sectional view and also shows each of piezoelectric scanner 120 and an elastic body 450 in a side view.

As shown in FIGS. 6 and 7, an actuator unit 400 included in the scanning probe microscope according to the fourth embodiment of the present invention includes a case 140 having a cylindrical shape with a bottom, an actuator 110, and an elastic body 450.

Elastic body 450 is a spring. As shown in FIG. 7, in the fourth embodiment of the present invention, eight springs are provided as elastic bodies. Eight springs are disposed at regular intervals on the outer circumference of piezoelectric scanner 120. It is to be noted that the number of springs is not limited to eight but may be at least one.

The scanning probe microscope according to the fourth embodiment of the present invention also allows the scanning speed to be raised while suppressing narrowing of the scanning range of piezoelectric scanner 120.

Fifth Embodiment

Figure 8:
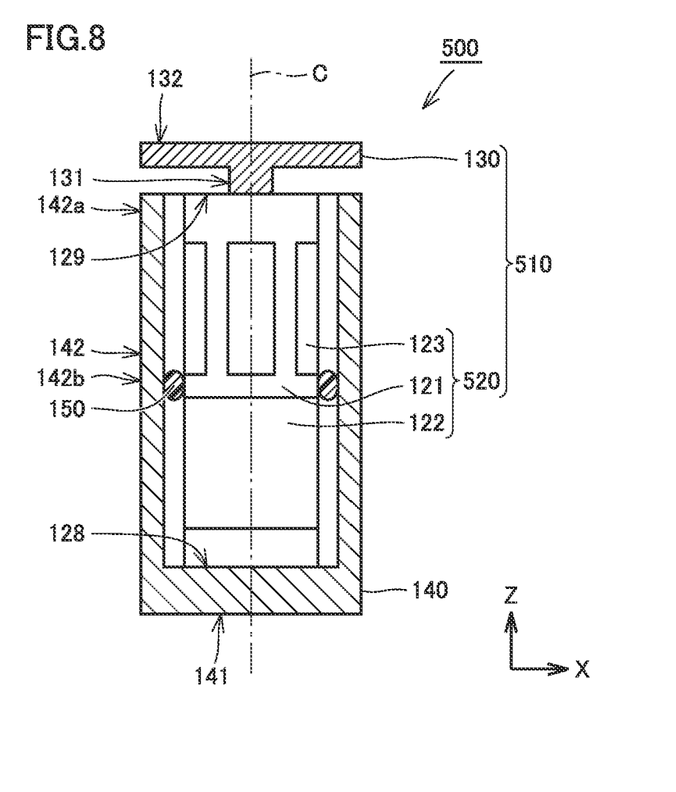
FIG. 8 is a partial cross-sectional view showing the configuration of an actuator unit included in a scanning probe microscope according to the fifth embodiment of the present invention.

The scanning probe microscope according to the fifth embodiment of the present invention is different from the scanning probe microscope according to the first embodiment of the present invention only in the arrangement of the electrode portion and the elastic body. Accordingly, the same configuration as that of the scanning probe microscope according to the first embodiment of the present invention will not be repeated.

FIG. 8 is a partial cross-sectional view showing the configuration of an actuator unit included in a scanning probe microscope according to the fifth embodiment of the present invention. FIG. 8 shows each of sample holder 130, case 140, and elastic body 150 in a cross-sectional view and also shows piezoelectric scanner 120 in a side view.

As shown in FIG. 8, an actuator unit 500 included in the scanning probe microscope according to the fifth embodiment of the present invention includes a case 140 having a cylindrical shape with a bottom, an actuator 510, and an elastic body 150.

Actuator 510 is disposed inside case 140. Actuator 510 includes a piezoelectric scanner 520 having a cylindrical shape and a sample holder 130.

Piezoelectric scanner 520 includes: a piezoelectric element 121 having a cylindrical shape; and a first electrode portion 122 and a second electrode portion 123 that are disposed on the outer circumference of piezoelectric element 121. In the present embodiment, first electrode portion 122 is located closer to first end 128 in the Z-axis direction than second electrode portion 123 is. Second end 129 of piezoelectric scanner 520 is closed.

Elastic body 150 is in contact with the inner circumferential surface of circumferential wall portion 142 at a position between first electrode portion 122 and second electrode portion 123 in the Z-axis direction.

In the scanning probe microscope according to the fifth embodiment of the present invention, first electrode portion 122 is located closer to first end 128 in the Z-axis direction than second electrode portion 123 is while elastic body 150 is in contact with circumferential wall portion 142 at a position between first electrode portion 122 and second electrode portion 123 in the Z-axis direction. Thereby, second end 129 of piezoelectric scanner 120 is provided as a free end. Consequently, as compared with the scanning probe microscope according to the first embodiment of the present invention, the scanning range of piezoelectric scanner 120 in two axis directions including the X-axis direction and the Y-axis direction can be widely ensured while equally raising the scanning speed (response speed) of piezoelectric scanner 120 in the Z-axis direction.

Sixth Embodiment

Figure 9:
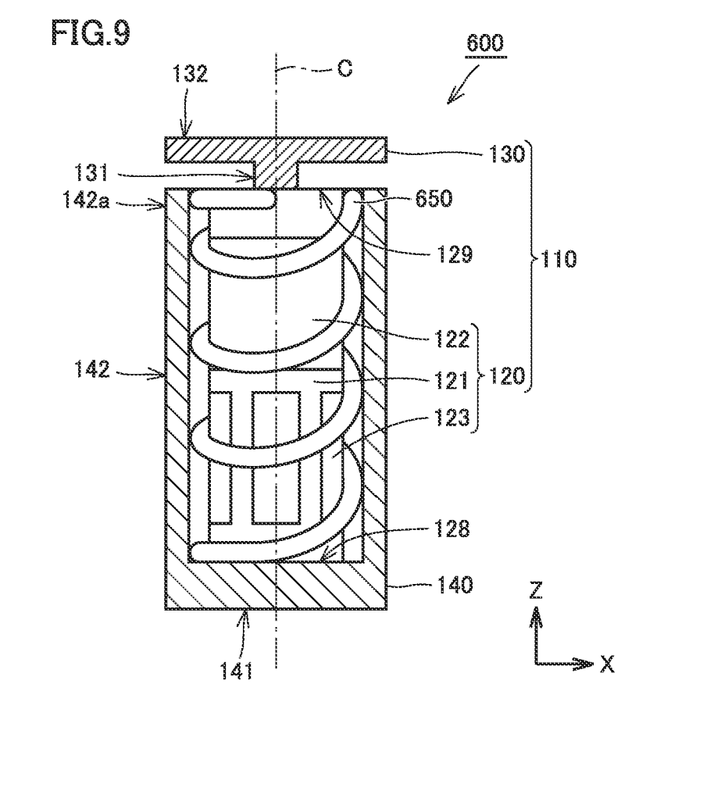
FIG. 9 is a partial cross-sectional view showing the configuration of an actuator unit included in a scanning probe microscope according to the sixth embodiment of the present invention.

The scanning probe microscope according to the sixth embodiment of the present invention is different from the scanning probe microscope according to the first embodiment of the present invention only in the configuration of the elastic body. Accordingly, the same configuration as that of the scanning probe microscope according to the first embodiment of the present invention will not be repeated.

FIG. 9 is a partial cross-sectional view showing the configuration of an actuator unit included in a scanning probe microscope according to the sixth embodiment of the present invention. FIG. 9 shows each of sample holder 130 and case 140 in a cross-sectional view and also shows each of piezoelectric scanner 120 and elastic body 650 in a side view.

As shown in FIG. 9, an actuator unit 600 included in the scanning probe microscope according to the sixth embodiment of the present invention includes a case 140 having a cylindrical shape with a bottom, an actuator 110, and an elastic body 650.

Elastic body 650 is an elastomer provided in a spiral shape. As shown in FIG. 9, in the sixth embodiment of the present invention, one spiral elastomer is provided as an elastic body. Elastic body 650 is disposed spirally on the outer circumference of piezoelectric scanner 120.

In the scanning probe microscope according to the fourth embodiment of the present invention, piezoelectric scanner 120 and case 140 are connected to each other continuously in the Z-axis direction with elastic body 650 interposed therebetween. As a result, the axial rigidity of actuator 110 can be effectively increased while the elastic resonance frequency of actuator 110 can be further raised. Thus, in the scanning probe microscope according to the fourth embodiment of the present invention, the scanning speed (the response speed) in the Z-axis direction can be further raised.

(Aspect)

It is understood by a person skilled in the art that the above-described exemplary embodiments each are provided as a specific example in the following aspect.

(Clause 1)

A scanning probe microscope according to one aspect includes: a case having a cylindrical shape with a bottom, the case having a bottom portion and a circumferential wall portion; an actuator disposed inside the case; at least one elastic body disposed between the case and the actuator; and a probe moved relative to the actuator for scanning. The actuator includes a piezoelectric scanner having a cylindrical shape and a sample holder. The piezoelectric scanner includes: a first end in an axis direction; a second end on a side opposite to the first end in the axis direction; a first electrode portion to which a voltage is applied such that the piezoelectric scanner is displaced in the axis direction; and a second electrode portion to which a voltage is applied such that the piezoelectric scanner is displaced in a direction orthogonal to the axis direction. The piezoelectric scanner is disposed inside the case to be coaxial with the case such that the first end is fixed to the bottom portion. The sample holder is provided at the second end of the piezoelectric scanner. The at least one elastic body is disposed so as to be sandwiched between the case and at least one of the piezoelectric scanner and the sample holder.

According to the scanning probe microscope described in Clause 1, the scanning probe microscope allows the scanning speed to be raised while suppressing narrowing of the scanning range.

(Clause 2)

In the scanning probe microscope described in Clause 1, the at least one elastic body is an O ring.

According to the scanning probe microscope described in Clause 2, intrusion of water and the like between the piezoelectric scanner and the case can be suppressed.

(Clause 3)

In the scanning probe microscope described in Clause 1 or Clause 2, the first electrode portion is located closer to the second end in the axis direction than the second electrode portion is, and the at least one elastic body is in contact with an end portion of the circumferential wall portion, the end portion being located on a side opposite to the bottom portion in the axis direction.

According to the scanning probe microscope described in Clause 3, the flexural rigidity of the piezoelectric scanner can be effectively increased, and the scanning speed (response speed) of the piezoelectric scanner in the Z-axis direction can be raised while the scanning speed of the piezoelectric scanner in two axis directions including the X-axis direction and the Y-axis direction can also be effectively raised.

(Clause 4)

In the scanning probe microscope described in Clause 1 or Clause 2, the first electrode portion is located closer to the first end in the axis direction than the second electrode portion is, and the at least one elastic body is in contact with the circumferential wall portion at a position between the first electrode portion and the second electrode portion in the axis direction.

According to the scanning probe microscope described in Clause 4, the scanning range of the piezoelectric scanner in two axis directions including the X-axis direction and the Y-axis direction can be widely ensured while raising the scanning speed (response speed) of the piezoelectric scanner in the Z-axis direction.

(Clause 5)

In the scanning probe microscope described in any one of Clause 1 to Clause 4, the sample holder includes: a flat plate portion that holds a sample; and a protruding portion that protrudes from an edge of the flat plate portion to surround an end portion of the circumferential wall portion of the case from outside, the end portion being located on a side opposite to the bottom portion in the axis direction.

The scanning probe microscope described in Clause 5 allows sealing between the sample holder and the case.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A scanning probe microscope comprising:
a case having a cylindrical shape with a bottom, the case having a bottom portion and a circumferential wall portion having an outside surface and an inside surface opposite the outside surface;
an actuator disposed inside the case;
a probe moved relative to the actuator for scanning, wherein
the actuator includes
a piezoelectric scanner having a cylindrical shape, and
a sample holder,
the sample holder includes
a flat plate portion that holds a sample, and
a protruding portion that protrudes from an edge of the flat plate portion to surround an end portion of the outside surface of the circumferential wall portion, the end portion being located on a side opposite to the bottom portion in an axis direction,
the piezoelectric scanner includes
a first end in the axis direction,
a second end on a side opposite to the first end in the axis direction,
a first electrode portion to which a voltage is applied such that the piezoelectric scanner is displaced in the axis direction, and
a second electrode portion to which a voltage is applied such that the piezoelectric scanner is displaced in a direction orthogonal to the axis direction; and
a first elastic body disposed between the protruding portion and the outside surface of the circumferential wall portion,
the piezoelectric scanner is disposed inside the case to be coaxial with the case such that the first end is fixed to the bottom portion, and
the sample holder is provided at the second end of the piezoelectric scanner.

2. The scanning probe microscope according to claim 1, wherein the first elastic body is an O ring.

3. The scanning probe microscope according to claim 2, wherein
the first electrode portion is located closer to the second end in the axis direction than the second electrode portion is, and
the first elastic body is in contact with the end portion of the outside surface of the circumferential wall portion.

4. The scanning probe microscope according to claim 1, wherein
the first electrode portion is located closer to the second end in the axis direction than the second electrode portion is, and
the first elastic body is in contact with the end portion of the outside surface of the circumferential wall portion.

5. The scanning probe microscope according to claim 4, further comprising:
a second elastic body disposed between the inside surface of the circumferential wall portion and the piezoelectric scanner,
wherein the second elastic body is in contact with the end portion of the inside surface of the circumferential wall portion.

6. The scanning probe microscope according to claim 5, wherein the second elastic body is an O ring.

7. The scanning probe microscope according to claim 1, further comprising:
a second elastic body disposed between the inside surface of the circumferential wall portion and the piezoelectric scanner.

8. The scanning probe microscope according to claim 7, wherein the second elastic body is an O ring.

* * * * *